(12) United States Patent
Bishop et al.

(10) Patent No.: US 8,437,974 B2
(45) Date of Patent: May 7, 2013

(54) CALIBRATION DETECTION SYSTEM AND METHOD

(75) Inventors: Richard W. Bishop, Verona, PA (US); Steven J. Nathenson, Playa Del Rey, CA (US); Ryan J. Hoover, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 357 days.

(21) Appl. No.: 12/900,555

(22) Filed: Oct. 8, 2010

(65) Prior Publication Data

US 2012/0089359 A1     Apr. 12, 2012

(51) Int. Cl.
*G01R 35/00*     (2006.01)
(52) U.S. Cl.
USPC ......................................................... 702/107
(58) Field of Classification Search .................. 702/107, 702/117, 118, 182–185, 188
See application file for complete search history.

(56) References Cited

U.S. PATENT DOCUMENTS

| 5,365,179 | A | 11/1994 | Rogers |
| 2003/0174068 | A1 | 9/2003 | Dobos et al. |
| 2005/0083068 | A1 | 4/2005 | Clarridge et al. |
| 2009/0298440 | A1 | 12/2009 | Takeya et al. |
| 2010/0033180 | A1* | 2/2010 | Biber et al. ................... 324/309 |

FOREIGN PATENT DOCUMENTS

WO     WO 2009/135163 A2     11/2009

* cited by examiner

*Primary Examiner* — Edward Raymond (57) ABSTRACT

An improved calibration detection system for use in calibrating an electronic apparatus includes a processor apparatus, an evaluation apparatus, and a connection apparatus. The connection apparatus includes a plurality of leads and is operated by the processor apparatus to internally switch and connect the various leads with various elements of the evaluation apparatus. By enabling all of the leads to be connected at the outset with the electronic apparatus and by internally switching the connections between the leads and the various elements of the evaluation apparatus, the calibration detection system saves time and avoids error in performing a testing protocol.

18 Claims, 3 Drawing Sheets

CALIBRATION DETECTION SYSTEM AND METHOD

BACKGROUND

1. Field

The disclosed and claimed concept relates generally to a calibration detection system and method and, more particularly, to a calibration detection system and method wherein the calibration detection system includes electrical leads that are connectable with an electronic apparatus and wherein the connection of the leads with various test devices are internally switched by the calibration detection system.

2. Related Art

In a facility as a nuclear power plant or other facility, sensors and other devices typically detect process conditions and other conditions, and data reflective of such conditions is provided to a central location such as a control room. Most typically, output in addition to the raw output from a sensor is needed in the control room. For instance, in addition to a currently existing pressure which may be output by a pressure sensor, it is desirable in the control room to additionally provide an average pressure, peak and minimum pressures, and other manipulations of the signal that is provided by the pressure sensor. As such, facilities that require such additional functions to be performed with respect to sensor signals typically include some type of electronic apparatus that receives the signal from the sensor, performs various manipulations on the signal, and provides one or more data streams to the control room.

Depending upon the sophistication of the electronic apparatus, and depending upon other factors as well, the electronic apparatus may need to be calibrated from time to time. For instance, an electronic apparatus in a nuclear power plant may be of an analog nature due to the old design of the electronic apparatus and the required compliance with federal requirements. Such an electronic apparatus may need frequent testing and calibration. On the other hand, an electronic apparatus that controls an aspect of a pharmaceutical manufacturing process may be entirely digital and require minimal calibration.

Regardless of the amount or frequency of calibration that is required of an electronic apparatus, such calibration operations are often time consuming, labor intensive, and error prone. For instance, in an electronic apparatus of an analog configuration that is used in a nuclear power plant, a technician typically is required to follow a testing protocol that includes connecting a digital multimeter to certain locations on an electronic component on the electronic apparatus, connecting a voltage source to certain locations on other components on the electronic apparatus, generating a signal, and noting the detected voltage (or other detected parameter), and recording the value on a record sheet. In nuclear power plants, such calibration protocols can be extremely cumbersome due to the variety of equipment that is involved and the degree of redundant equipment that is provided in order to enable a margin of operational safety.

Since the testing protocol for any given electronic apparatus typically is detailed and complicated, it can be prone to error. For instance, a first step might require a technician to connect certain equipment to certain components of the electronic apparatus and to provide a certain input signal to the electronic apparatus, and to note the detected output on a measurement device and record it. One or more of the connections between the electronic apparatus and the testing equipment then must be reconnected to other components of the electronic apparatus in a fashion that is specified in the testing protocol. Such varied connections and re-connections invite error due to their complexity. Moreover, such operations are labor-intensive and time-consuming. It thus would be desirable to provide an improved system that overcomes these and other shortcomings with known testing methodologies.

SUMMARY

An improved calibration detection system for use in calibrating an electronic apparatus includes a processor apparatus, an evaluation apparatus, and a connection apparatus. The evaluation apparatus includes one or more signal generators and one or more measurement devices such as volt meters. The connection apparatus includes a plurality of leads and is operated by the processor apparatus to internally switch and connect the various leads with various elements of the evaluation apparatus. By enabling all of the leads to be connected at the outset with the electronic apparatus and by internally switching the connections between the leads and the various elements of the evaluation apparatus, the calibration detection system saves time and avoids error in performing a testing protocol.

Accordingly, an aspect of the disclosed and claimed concept is to provide an improved calibration detection system.

Another aspect of the disclosed and claimed concept is to provide an improved method of performing a testing protocol on an electronic apparatus using such an improved calibration detection system.

These and other aspects of the disclosed and claimed concept are provided by an improved calibration detection system for use in calibrating an electronic apparatus that is structured to receive an input signal and to perform one or more operations using the input signal and to provide an output signal based at least in part upon the signal and the one or more operations. The general nature of the calibration detection system can be stated as including a processor apparatus that comprises a processor and a storage, an evaluation apparatus in communication with the processor and comprising at least a first signal generator and at least a first measurement device, and a connection apparatus comprising a plurality of leads, at least some of the leads each being connected with at least one of the at least first signal generator and the at least first measurement device and being structured to be connected with the electronic apparatus. The storage has stored therein one or more routines which, when executed on the processor, cause the calibration detection system to perform operations, the general nature of which can be stated as including inputting to the electronic apparatus with a first number of the leads at least a first input signal from the least first signal generator, detecting from the electronic apparatus with a second number of the leads at least a first output signal with the least first measurement device, and making a determination based at least in part upon the at least first input signal and the at least first output signal whether or not at least a portion of the electronic apparatus is properly calibrated.

Other aspects of the disclosed and claimed concept are provided by an improved method of operating a calibration detection system in calibrating an electronic apparatus that is structured to receive an input signal and to perform one or more operations using the input signal and to provide an output signal based at least in part upon the signal and the one or more operations. The calibration detection system can be stated as including a processor apparatus that includes a processor and a storage, an evaluation apparatus in communication with the processor and including at least a first signal generator and at least a first measurement device, a connection apparatus including a plurality of leads, with at least some of the leads each being connected with at least one of the at least first signal generator and the at least first measurement device and being structured to be connected with the electronic apparatus. The general nature of the method can be stated as including inputting to the electronic apparatus with a first number of the leads at least a first input signal from the least first signal generator, detecting from the electronic apparatus with a second number of the leads at least a first output signal with the least first measurement device, and making a determination based at least in part upon the at least first input signal and the at least first output signal whether or not at least a portion of the electronic apparatus is properly calibrated.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
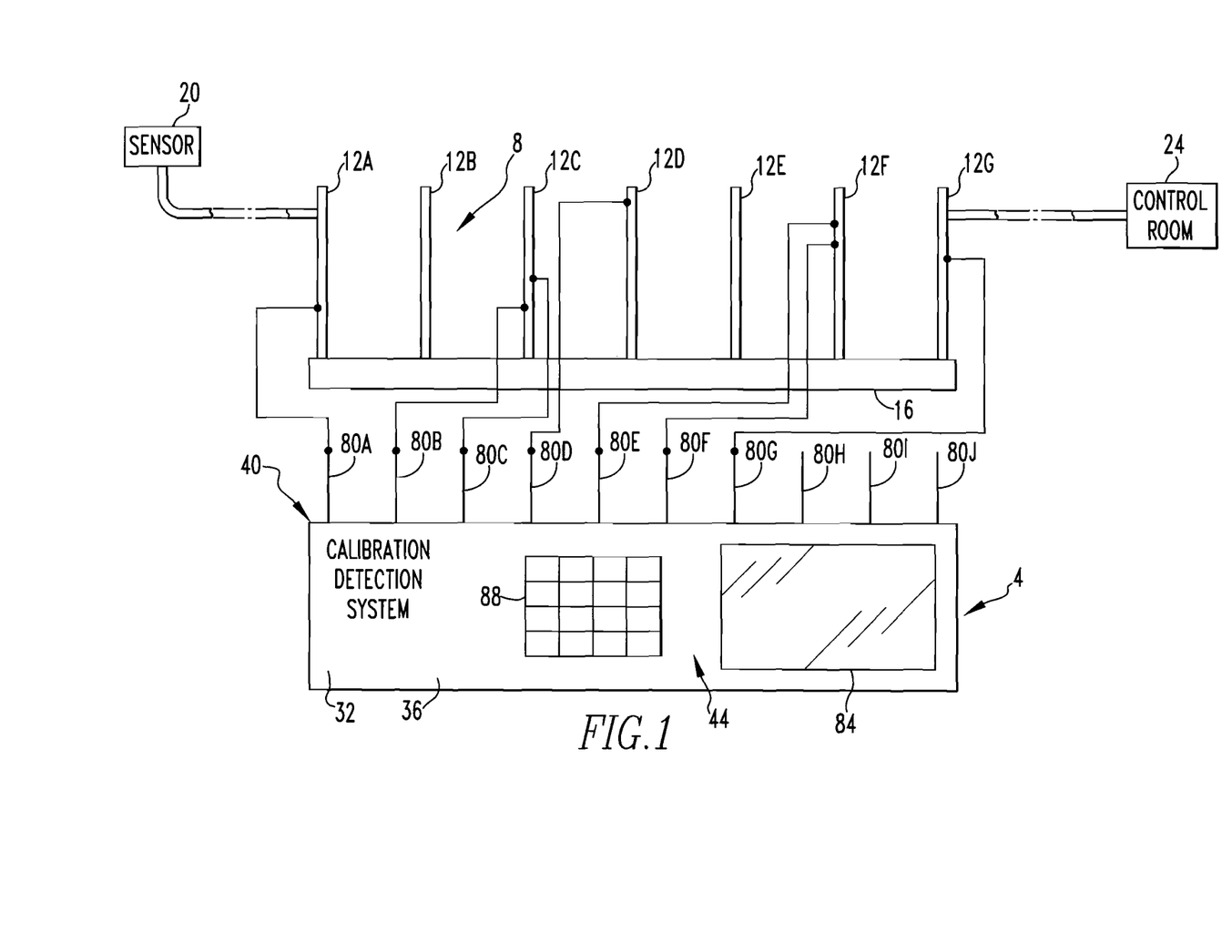
FIG. 1 is a schematic depiction of an improved calibration detection system in accordance with the disclosed and claimed concept connected with an electronic apparatus during performance of a testing protocol.

An improved calibration detection system 4 in accordance with the disclosed and claimed concept is depicted schematically in FIG. 1 as being connected with an electronic apparatus 8. The electronic apparatus 8 can be any of a wide variety of equipment and, in the exemplary embodiment depicted herein, is a card rack that is employed in a facility such as a nuclear power plant or other facility.

The exemplary electronic apparatus 8 includes an exemplary seven functional cards designated 12A-12G which, in the embodiment depicted herein, are analog in nature and include various exposed electronic components such as capacitors, resistors, transistors, and the like. It is noted, however, that in other embodiments one or more digital cards can be employed without departing from the present concept. The electronic apparatus 8 additionally includes a connector 16 to which all of the cards 12A-12G are connected. A sensor 20 such as a pressure sensor or other sensor is connected with the electronic apparatus 8, and a connection also exists between the electronic apparatus 8 and a control room 24.

As is understood in the relevant art, the electronic apparatus 8 detects a signal from the sensor 20 and performs a function on the signal, such as by detecting a signal indicative of a pressure value from the sensor 20 over a period of time and communicating to the control room 24 a value for the average pressure over the given period of time. Other functions or additional functions or both can be provided by the electronic apparatus 8 depending upon the needs of the application.

Figure 2:
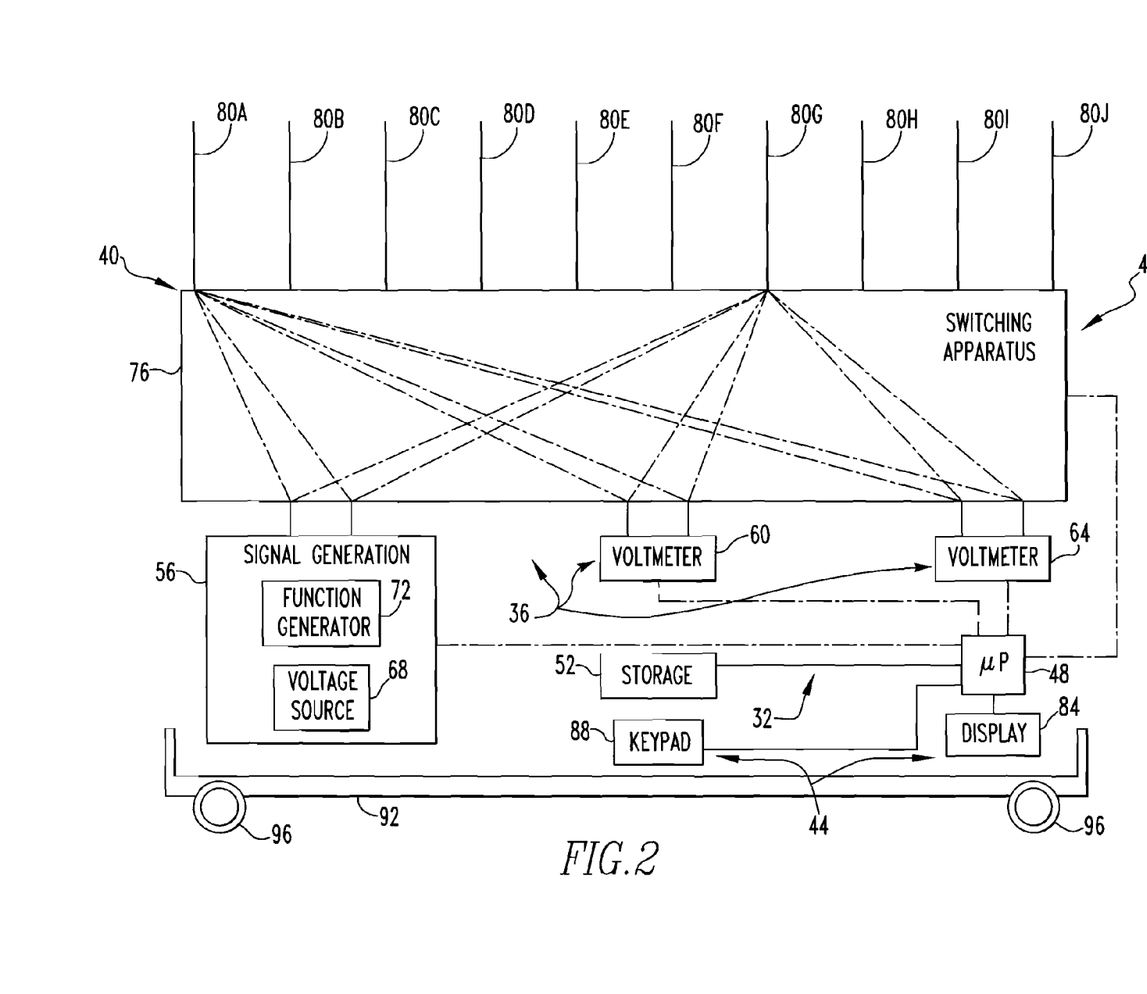
FIG. 2 is a detailed schematic depiction of the improved calibration detection system of FIG. 1.

The improved calibration detection system 4 that is depicted schematically in FIG. 1 and is depicted in a more detailed fashion in FIG. 2 comprises a processor 32, an evaluation apparatus 36, a connection apparatus 40, and an I/O apparatus 44. The processor apparatus 32 comprises a processor 48 that can be any of a wide variety of processors, and may be a microprocessor (µP) or other type of processor. The storage can be any of a variety of types of electronic storage devices such as memory like RAM, ROM, EPROM, and the like without limitation that serves as a storage device for the storage of data, routines, and other electronic material.

One of the routines stored in the storage 52 is an operating system routine by which the processor 48 controls the various elements of the evaluation apparatus 36, the connection apparatus 40, and the I/O apparatus 44. The operating system routine is standardized on the calibration detection system 4 and is generally unchanged regardless of the environment in which the calibration detection system 4 is deployed. Another of the routines is a customized calibration routine that is specific to the facility where the calibration detection system 4 is deployed and which includes the various custom-written testing protocols that are associated with the electronic apparatuses 8 at the facility. Execution of the various routines on the processor 48 causes the calibration detection system 4 to perform various operations such as will be described in greater detail elsewhere herein.

The processor 48 is connected with and controls the evaluation apparatus 36, the connection apparatus 40, and the I/O apparatus 44. The evaluation apparatus 36 comprises one or more signal generators 56 and one or more measurement devices 60, 64. In the embodiment depicted herein, the measurement devices 60, 64 are voltmeters and, more particularly, are digital multimeters, although other and/or additional measurement devices may be employed without departing from the present concept.

The signal generator 56 comprises a voltage source 68 and a function generator 72 that are connected together. The function generator 72 generates various functions such as ramp functions, step functions, saw tooth functions, sine wave functions, and the like and cooperates with the voltage source to generate voltage signals that follow the aforementioned functions from the function generator 72.

The connection apparatus 40 comprises a switching apparatus 76 and a plurality of leads, ten in the depicted exemplary embodiment, which are numbered 80A-80J. The leads are all connected with the switching apparatus 76, which is controlled by the processor 48. Connections from the components of the evaluation apparatus 36, such as the signal generator 56 and the measurement devices 60, 64, are likewise connected with the switching apparatus 76. Advantageously, the switching apparatus internally connects any of the leads 80A-80J with any of the components of the evaluation apparatus 36. It is noted that FIG. 2 depicts only the leads 80A and 80G as being connectable via the switching apparatus 76 with all of the connections of the signal generator 56 and the measurement devices 60, 64, but it is noted that the switching apparatus 76 actually is capable of independently switching any of the leads 80A-80J with any of the connections to any components of the evaluation apparatus 36.

Advantageously, a large number of the leads 80A-80J are provided, which enables a technician to connect at the outset of the testing operation all of the connections that will be performed by the calibration detection system 4 without requiring the technician to reconnect any of the leads 80A-80J during the course of a testing protocol. As mentioned above, the customized calibration routine stored in the storage 52 will typically include a testing protocol for many if not all of the various electronic apparatuses 8 that exist at the facility where the calibration detection system 4 is deployed. The testing protocols typically will be in the form of some custom written code that is based upon the operational manuals that are used at the facility where the calibration detection system 4 is deployed.

The testing protocol for any given electronic apparatus may first call, for example, for a step voltage that steps between 1.0 volts and 3.0 volts at one second intervals for 15 seconds, with the input being provided to a specific location on a specific component of the card 12C and with the output voltage being detected from a specific location on a specific component of the card 12A. By way of example, therefore, and as can be understood from FIGS. 1 and 2, the switching apparatus 76 would thus internally connect the lead 80C with the signal generator 56 and may connect the lead 80A with the voltmeter 60. The calibration detection system 4 would then input the aforementioned step function voltage into the electronic apparatus 8 as indicated above and detect the resultant voltage, if any, with the voltmeter 60.

If the detected voltage indicates proper calibration of a first portion of the electronic apparatus 8, the processor 48 may then execute a next part of the testing protocol, which may be to apply a fixed voltage of 1.5 volts to a specific location of a specific component on card 12F and to simultaneously detect the voltage from a particular location on a particular component of card 12D and also from a particular location on a particular component of card 12G. In order to do so, the switching apparatus 76 will internally reconnect the various leads 80 with the various components of the evaluation apparatus 36 by internally connecting the lead 80E with the signal generator 56, connecting the lead 80D with voltmeter 60, and by connecting the lead 80G with the voltmeter 64. The calibration detection system 4 would then generate the aforementioned signal and simultaneously detect the voltages as indicated.

Thus, the technician can be directed to connect all of the various leads 80A-80J to all of the various locations on the cards 12A-12G that will be evaluated during the course of the entire testing protocol, and the switching apparatus 76 which is controlled by the processor 48 will internally switch the connections among the various leads 80A-80J and the components of the evaluation apparatus 36 to perform the various testing operations that make up the testing protocol. The use of the calibration detection system 4 along with its stored testing protocols thus advantageously avoids the need for the technician to periodically disconnect and reconnect various leads 80A-80J with various other components of the electronic apparatus 8 as performance of the testing protocol proceeds.

The aforementioned examples of a testing protocol are not intended to be limiting, and rather it is noted that the testing protocols typically have a much more richly developed set of instructions. For instance, in comparing a fixed tested value such as a voltage with a fixed expected value for the voltage, the testing protocol typically will employ a tolerance that is particular to the specific measurement being taken on the specific electronic apparatus 8 and which typically is in the form of a certain percentage of the measured signal plus a certain percentage of the measurement scale. By way of example, a certain voltage tolerance might be ±1.00% of the expected measured signal (in Volts, say) combined with ±4.00% of the scale (0 to 100 Volts, say). If the expected measurement is 50 Volts, the tolerance would be ±1.00% of 50 Volts, which equals 0.50 Volts, added to ±4.00% of the 100 Volt scale, which equals 4.00 Volts, for a total tolerance of ±4.50 Volts.

However, the testing protocol also is configured to enable testing when the input and/or the expected output vary as a function of time, such in the circumstance of a voltage input or output that follows one or more of a ramp function, a step function, a saw tooth function, and a sine wave function, and/or when a time delay is expected between application of the input and detection of the output. In such a circumstance, the appropriate tolerances will vary as a function of time, and the testing protocol advantageously includes the ability to calculate in real time and apply the correct tolerances that are specific to application of the particular input as a function of time.

The I/O apparatus 44 includes a display 84 and a keyboard 88, both of which are connected with the processor 48. The keyboard 88 is usable for the technician to input data such as an identification code of the electronic apparatus 8, which can cause the processor 48 to employ the identification code to retrieve from the storage 52 the associated testing protocol that has been written and stored for use in connection with the particular electronic apparatus 8.

The display 84 can display instructions to the technician, such as a diagram for connecting various leads 80A-80J to the various elements of the electronic apparatus 8, and can provide further instructions to the technician. For instance, in performing the various parts of the testing protocol, it may be a part of the testing protocol for the technician to replace a given component such as a given card 12A-12G of the electronic apparatus 8. Alternatively, the technician may be instructed to adjust the gain on a given card 12A-12G or to refurbish a card 12A-12G. Moreover, the display 84 can output to the technician a description of each individual testing step in the testing protocol and can await an expressed, i.e., input, concurrence from the technician before each such individual testing step is actually performed. Additionally, the display can be configured to output in real time the input that is generated and the results that are obtained, meaning that the display 84 can simulate the output that would otherwise be provided on the individual displays of the signal generator 56 and the voltmeters 60, 64.

The display 84 can also ultimately instruct the technician that testing and calibration has been completed on the electronic apparatus and that the calibration detection system 4 can be connected with a different electronic apparatus 8. Advantageously, a platform 92 and wheels 96 are provided for transporting the calibration detection system 4 among the various electronic apparatuses 8, only one of which is expressly depicted herein for purposes of clarity.

Figure 3:
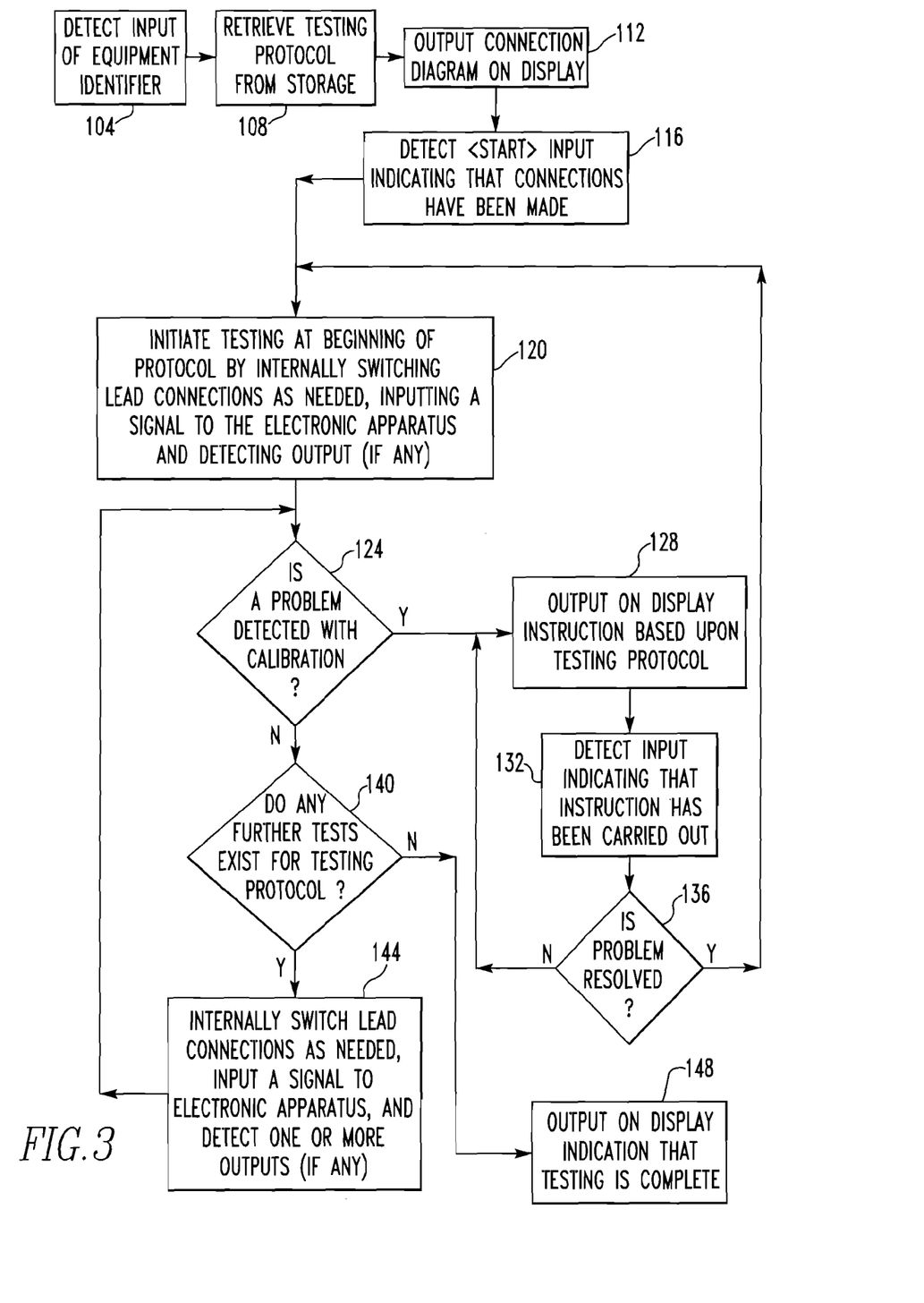
FIG. 3 is a flowchart depicting certain aspects of an improved method in accordance with the disclosed and claimed concept that employs the calibration detection system of FIG. 1.

A flowchart depicting certain aspects of an improved method in accordance with the disclosed and claimed concept is depicted generally in FIG. 3. Processing can begin with the detection by the calibration detection system 4 of the input of an identification code, such as the equipment identifier as at 104. Such an input can occur by the technician typing the identification code of the particular electronic apparatus 8 that is to be calibrated.

The calibration detection system 4 then can retrieve, as at 108, the testing protocol that is associated with the particular electronic apparatus 8 that was identified by the technician at 104. The processor 48 can then cause the display 84 to output, as at 112, a connection diagram which instructs the technician how the various leads 80A-80J should be connected with the various cards 12A-12G in order to perform all of the testing operations of the entire testing protocol that was retrieved, as at 108. It is noted that fewer than all of the leads 80A-80J may be employed in performing any given testing protocol, and it is further noted that fewer than all of the cards 12A-12G may be connected with the leads 80A-80J during such a testing protocol. It is also understood that the ten leads 80A-80G are provided for exemplary purposes only, as are the seven cards 12A-12G, it being noted that either can have greater or lesser numbers without departing from the present concept.

Once the various leads 80A-80J have been connected to the various locations on the electronic apparatus 8, the technician can indicate to the calibration detection system 4 that such connections have been made by providing, as at 116, a <START> command. Initiation of the testing protocol then occurs, as at 120, by internally switching with the switching apparatus 76 the various leads 80A-80J to be connected with the various components of the evaluation apparatus 36 that are needed in order to perform the first test, by inputting an appropriate signal with the signal generator 56 to the electronic apparatus 8, and by detecting an output with the voltmeters 60, 64, or both, as appropriate. The testing protocol indicates to the processor 48 the various test parameters.

It is then determined, as at 124, whether a problem is detected with the calibration of the particular component that is being tested at that point in the testing protocol of the electronic apparatus 8. If such a problem with calibration is detected, processing continues, as at 128, where the testing protocol is consulted to identify a particular instruction that will be output on the display 84 for the technician to perform. An input is then detected, as at 132, indicating that the displayed instruction has been carried out, and it is then determined, as at 136, whether the problem has been solved. If the problem has not been solved, processing continues, as at 128, where the testing protocol is further consulted, and further instructions are output on the display 84 for the technician. On the other hand, if it is determined at 136 that the problem has been solved, processing continues, as at 120, where the entire testing protocol is re-executed from its beginning. The testing protocol is reinitiated in such a situation since the actions taken by the technician have resulted in some type of change to the electronic apparatus 8, which might have affected what would have happened in earlier portions of the testing protocol. The testing protocol therefore is reinitiated to reevaluate all of the elements of the electronic apparatus 8 now that the problem has been solved, as at 136.

On the other hand, if it is determined, as at 124, that a problem was not detected with calibration of the particular component that was being tested in the electronic apparatus 8, processing continues, as at 140, where it is determined whether any remaining portions of the testing protocol exist that have not yet been executed. If so, processing continues, as at 144, where the switching apparatus 76 internally switches lead connections, as needed, with various components of the evaluation apparatus 36, generates new signals with the signal generator, and detects one or more output signals, if any, using the voltmeters 60 or 64 or both. Processing then continues, as at 124, where it is determined whether a problem is detected with the calibration of the component that is currently under test in the electronic apparatus 8.

On the other hand, if it is determined at 140 that no further tests exist in the current testing protocol, the display 84 outputs an indication that testing for the electronic apparatus 8 is complete. The calibration detection system 4 can then be disconnected from the electronic apparatus 8, can be wheeled to another electronic apparatus 8 (not expressly depicted herein) and the process repeated, as at 104.

The improved calibration detection system 4 and method can thus save time by eliminating much of the effort that otherwise would be required of a technician, and can further reduce errors by avoiding the tedious reconnection that otherwise is required with prior systems. Advantageously, the calibration detection system 4 can additionally fill in the various blanks on the testing forms with the results that are detected with and/or derived from the voltmeters 60 and 64 or other components of the evaluation apparatus 36. In this regard, it is understood that any number of voltmeters, signal generators, and other devices can be employed in the evaluation apparatus 36 without departing from the present concept. Thus, in addition to voltages themselves, the calibration detection system 4 can record values such as the time to reach a detected voltage, a strip status of a card, and virtually any other type of information that may desirably be obtained and recorded. By storing multiple testing protocols. i.e., one for each of the various different electronic apparatuses 8 at a facility, an individual technician using an individual calibration detection system 4 can perform far more calibration and testing than was ever previously possible with previous systems.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A calibration detection system for use in calibrating an electronic apparatus that is structured to receive an input signal and to perform one or more operations using the input signal and to provide an output signal based at least in part upon the signal and the one or more operations, the calibration detection system comprising:

a processor apparatus that comprises a processor and a storage;

an evaluation apparatus in communication with the processor and comprising at least a first signal generator and at least a first measurement device;

a connection apparatus comprising a plurality of leads, at least some of the leads each being connected with at least one of the at least first signal generator and the at least first measurement device and being structured to be connected with the electronic apparatus;

the storage having stored therein one or more routines which, when executed on the processor, cause the calibration detection system to perform operations comprising:

inputting to the electronic apparatus with a first number of the leads at least a first input signal from the least first signal generator;

detecting from the electronic apparatus with a second number of the leads at least a first output signal with the least first measurement device;

making a determination based at least in part upon the at least first input signal and the at least first output signal whether or not at least a portion of the electronic apparatus is properly calibrated; and wherein the operations further comprise outputting an instruction representative of a number of locations on the electronic apparatus where the first number of the leads and the second number of the leads are to be connected.

2. The calibration detection system of claim 1 wherein the storage has stored therein a testing protocol that is associated with the electronic apparatus, and wherein the operations further comprise:

detecting an input representative of an identification of the electronic apparatus;

employing the identification of the electronic apparatus to retrieve from the storage at least a portion of the testing protocol; and obtaining from the at least portion of the testing protocol the number of locations on the electronic apparatus where the first number of the leads and the second number of the leads are to be connected.

3. The calibration detection system of claim 1 wherein the storage has stored therein a testing protocol that is associated with the electronic apparatus, and wherein the operations further comprise employing at least a portion of the testing protocol in the making of the determination.

4. A calibration detection system for use in calibrating an electronic apparatus that is structured to receive an input signal and to perform one or more operations using the input signal and to provide an output signal based at least in part upon the signal and the one or more operations, the calibration detection system comprising:
- a processor apparatus that comprises a processor and a storage;
- an evaluation apparatus in communication with the processor and comprising at least a first signal generator and at least a first measurement device;
- a connection apparatus comprising a plurality of leads, at least some of the leads each being connected with at least one of the at least first signal generator and the at least first measurement device and being structured to be connected with the electronic apparatus;
- the storage having stored therein one or more routines which, when executed on the processor, cause the calibration detection system to perform operations comprising:
- inputting to the electronic apparatus with a first number of the leads at least a first input signal from the least first signal generator;
- detecting from the electronic apparatus with a second number of the leads at least a first output signal with the least first measurement device;
- making a determination based at least in part upon the at least first input signal and the at least first output signal whether or not at least a portion of the electronic apparatus is properly calibrated;
- wherein the storage has stored therein a testing protocol that is associated with the electronic apparatus, and wherein the operations further comprise employing at least a portion of the testing protocol in the making of the determination; and
- wherein the operations further comprise outputting an instruction, based at least in part upon at least one of the determination and the testing protocol, that at least one of:
- a particular component of the electronic apparatus should be replaced;
- a particular component of the electronic apparatus should be adjusted; and
- a particular component of the electronic apparatus should be refurbished.

5. The calibration detection system of claim 4 wherein the operations further comprise detecting an input representative of the instruction having been carried out and, responsive thereto, again performing the inputting, the detecting, and the making of a determination.

6. The calibration detection system of claim 4 wherein the operations further comprise:
- inputting as the at least a first input signal a plurality of input signals;
- detecting as the at least a first output signal a plurality of output signals, at least some of which each being responsive to at least one of the plurality of input signals; and
- making as the determination a determination that is based at least in part upon at least a portion of the plurality of input signals and at least a portion of the plurality of output signals.

7. A calibration detection system for use in calibrating an electronic apparatus that is structured to receive an input signal and to perform one or more operations using the input signal and to provide an output signal based at least in part upon the signal and the one or more operations, the calibration detection system comprising:
- a processor apparatus that comprises a processor and a storage;
- an evaluation apparatus in communication with the processor and comprising at least a first signal generator and at least a first measurement device;
- a connection apparatus comprising a plurality of leads, at least some of the leads each being connected with at least one of the at least first signal generator and the at least first measurement device and being structured to be connected with the electronic apparatus;
- the storage having stored therein one or more routines which, when executed on the processor, cause the calibration detection system to perform operations comprising:
- inputting to the electronic apparatus with a first number of the leads at least a first input signal from the least first signal generator;
- detecting from the electronic apparatus with a second number of the leads at least a first output signal with the least first measurement device; and
- making a determination based at least in part upon the at least first input signal and the at least first output signal whether or not at least a portion of the electronic apparatus is properly calibrated;
- inputting as the at least a first input signal a plurality of input signals;
- detecting as the at least a first output signal a plurality of output signals, at least some of which each being responsive to at least one of the plurality of input signals;
- making as the determination a determination that is based at least in part upon at least a portion of the plurality of input signals and at least a portion of the plurality of output signals; and
- wherein the operations further comprise at least one of:
- simultaneously inputting at least two of the plurality of input signals; and
- simultaneously detecting at least two of the plurality of output signals.

8. The calibration detection system of claim 7 wherein the evaluation apparatus further comprises a plurality of measurement devices in communication with the processor, and wherein the operations further comprise simultaneously detecting:
- an output signal of the plurality of output signals with a measurement device of the plurality of measurement devices, and
- another output signal of the plurality of output signals with another measurement device of the plurality of measurement devices.

9. The calibration detection system of claim 4 wherein the connection apparatus further comprises a switching apparatus that is connected between at least some of the leads and at least a portion of the evaluation apparatus, and wherein the operations further comprise switching with the switching apparatus a connection of at least a first lead of the at least some of the leads among the at least one of the at least first signal generator and the at least first measurement device responsive to a number of signals from the processor apparatus.

10. A method of operating a calibration detection system in calibrating an electronic apparatus that is structured to receive an input signal and to perform one or more operations using the input signal and to provide an output signal based at least in part upon the signal and the one or more operations, the calibration detection system including a processor apparatus that comprises a processor and a storage, an evaluation apparatus in communication with the processor and comprising at least a first signal generator and at least a first measurement device, a connection apparatus comprising a plurality of leads, with at least some of the leads each being connected with at least one of the at least first signal generator and the at least first measurement device and being structured to be connected with the electronic apparatus, the method comprising:
    inputting to the electronic apparatus with a first number of the leads at least a first input signal from the least first signal generator;
    detecting from the electronic apparatus with a second number of the leads at least a first output signal with the least first measurement device;
    making a determination based at least in part upon the at least first input signal and the at least first output signal whether or not at least a portion of the electronic apparatus is properly calibrated; and
    outputting an instruction representative of a number of locations on the electronic apparatus where the first number of the leads and the second number of the leads are to be connected.

11. The method of claim 10 wherein the storage has stored therein a testing protocol that is associated with the electronic apparatus, and further comprising:
    detecting an input representative of an identification of the electronic apparatus;
    employing the identification of the electronic apparatus to retrieve from the storage at least a portion of the testing protocol; and
    obtaining from the at least portion of the testing protocol the number of locations on the electronic apparatus where the first number of the leads and the second number of the leads are to be connected.

12. The method of claim 10 wherein the storage has stored therein a testing protocol that is associated with the electronic apparatus, and further comprising employing at least a portion of the testing protocol in the making of the determination.

13. A method of operating a calibration detection system in calibrating an electronic apparatus that is structured to receive an input signal and to perform one or more operations using the input signal and to provide an output signal based at least in part upon the signal and the one or more operations, the calibration detection system including a processor apparatus that comprises a processor and a storage, the storage having stored therein a testing protocol that is associated with the electronic apparatus, an evaluation apparatus in communication with the processor and comprising at least a first signal generator and at least a first measurement device, a connection apparatus comprising a plurality of leads, with at least some of the leads each being connected with at least one of the at least first signal generator and the at least first measurement device and being structured to be connected with the electronic apparatus, the method comprising:
    inputting to the electronic apparatus with a first number of the leads at least a first input signal from the least first signal generator;
    detecting from the electronic apparatus with a second number of the leads at least a first output signal with the least first measurement device;
    making a determination based at least in part upon the at least first input signal and the at least first output signal whether or not at least a portion of the electronic apparatus is properly calibrated;
    employing at least a portion of the testing protocol in the making of the determination; and
    outputting an instruction, based at least in part upon at least one of the determination and the testing protocol, that at least one of:
    a particular component of the electronic apparatus should be replaced;
    a particular component of the electronic apparatus should be adjusted; and
    a particular component of the electronic apparatus should be refurbished.

14. The method of claim 13, further comprising detecting an input representative of the instruction having been carried out and, responsive thereto, again performing the inputting, the detecting, and the making of a determination.

15. The method of claim 13, further comprising:
    inputting as the at least a first input signal a plurality of input signals;
    detecting as the at least a first output signal a plurality of output signals, at least some of which each being responsive to at least one of the plurality of input signals; and
    making as the determination a determination that is based at least in part upon at least a portion of the plurality of input signals and at least a portion of the plurality of output signals.

16. A method of operating a calibration detection system in calibrating an electronic apparatus that is structured to receive an input signal and to perform one or more operations using the input signal and to provide an output signal based at least in part upon the signal and the one or more operations, the calibration detection system including a processor apparatus that comprises a processor and a storage, an evaluation apparatus in communication with the processor and comprising at least a first signal generator and at least a first measurement device, a connection apparatus comprising a plurality of leads, with at least some of the leads each being connected with at least one of the at least first signal generator and the at least first measurement device and being structured to be connected with the electronic apparatus, the method comprising:
    inputting to the electronic apparatus with a first number of the leads at least a first input signal from the least first signal generator;
    detecting from the electronic apparatus with a second number of the leads at least a first output signal with the least first measurement device;
    making a determination based at least in part upon the at least first input signal and the at least first output signal whether or not at least a portion of the electronic apparatus is properly calibrated;
    inputting as the at least a first input signal a plurality of input signals;
    detecting as the at least a first output signal a plurality of output signals, at least some of which each being responsive to at least one of the plurality of input signals;
    making as the determination a determination that is based at least in part upon at least a portion of the plurality of input signals and at least a portion of the plurality of output signals; and
    further comprising at least one of:

simultaneously inputting at least two of the plurality of input signals; and simultaneously detecting at least two of the plurality of output signals.

17. The method of claim 16 wherein the evaluation apparatus further comprises a plurality of measurement devices in communication with the processor, and further comprising simultaneously detecting:

an output signal of the plurality of output signals with a measurement device of the plurality of measurement devices, and another output signal of the plurality of output signals with another measurement device of the plurality of measurement devices.

18. The method of claim 13 wherein the connection apparatus further comprises a switching apparatus that is connected between at least some of the leads and at least a portion of the evaluation apparatus, and further comprising switching with the switching apparatus a connection of at least a first lead of the at least some of the leads among the at least one of the at least first signal generator and the at least first measurement device responsive to a number of signals from the processor apparatus.

* * * * *